(Model.)
W. RICHARDS.
PLOW.
No. 246,416. Patented Aug. 30, 1881.
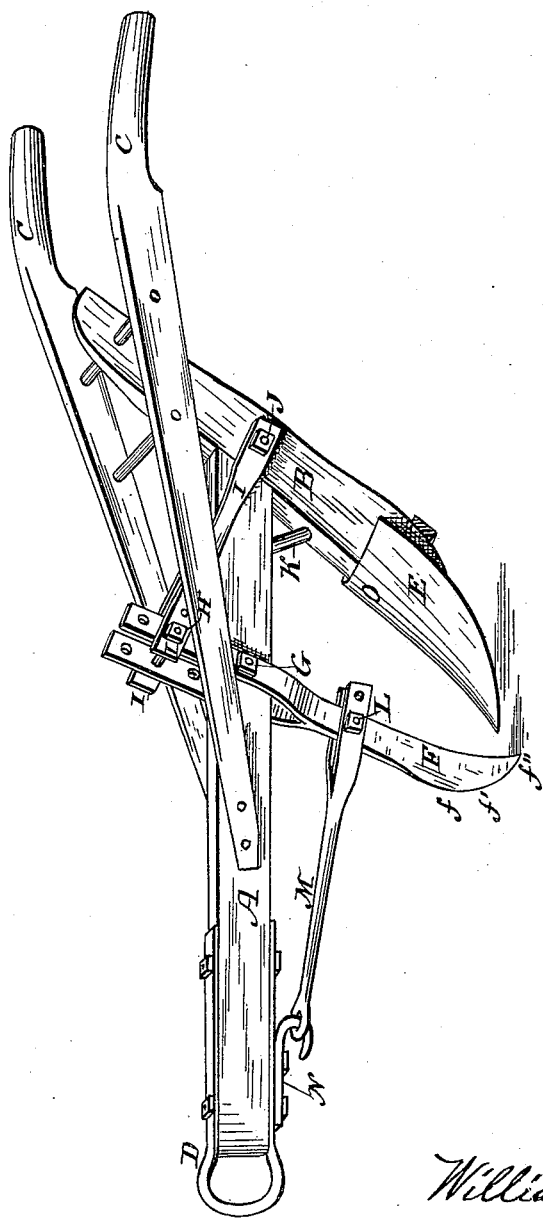
Witnesses:
Chas Flint
W. F. Croisman
William Richards
Inventor
By [signature]
Atty.

UNITED STATES PATENT OFFICE.

WILLIAM RICHARDS, OF CAIRO, WEST VIRGINIA.

PLOW.

SPECIFICATION forming part of Letters Patent No. 246,416, dated August 30, 1881.

Application filed July 21, 1881. (Model.)

*To all whom it may concern:*

Be it known that I, WILLIAM RICHARDS, a citizen of the United States of America, residing at Cairo, in the county of Ritchie and State of West Virginia, have invented certain new and useful Improvements in Plows; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

My invention relates to certain improvements in plows, and has special reference to certain devices or attachments which operate to remove obstructions to the forward movement of the plow, or to cause the plow to pass over such obstructions when too large to be removed, in the manner hereinafter to be explained.

My invention consists in certain devices and combinations of devices, as hereinafter more specifically described and set forth in the claims.

It is well known that the most common obstructions met by the plow when in operation are roots and rocks or boulders, the former offering when comparatively slight in size great resistance to the advancement of the plow, and when of large size they, like rocks, necessitate a withdrawal of the plow from the furrow and a guidance thereof over or around the obstruction.

I have devised a colter of such shape that it will cut roots of small and of medium diameters, and will pass over and lead the plow over roots of larger diameter and rocks too large or too deeply seated to be moved by the plow in its ordinary operation.

Referring to the drawing, A is the beam, B the standard, C C the handles, D the clevis, and E the share, of a plow, all of the usual construction.

F is the colter, which is bifurcated at its upper end and embraces the beam A, and is secured thereto by the bolt G. Each branch of the colter is extended upward beyond the beam, and each is provided with a series of holes for the reception at different elevations from the beam of the bolt H, which is used to connect the colter with the brace-rods I I, the rear ends of which are secured to the standard B by a bolt, J, which passes through said brace-rods, the standard, and the beam A mortised therein.

K is a tie or brace rod connecting the standard and beam for the purpose of strengthening the plow.

The lower portion of the colter F is curved to the front and is provided with a knife-edge, $f$, a dull edge, $f'$, and a rearwardly-projecting point, $f''$.

A bolt, L, passing through the rear bifurcated end of a connecting-rod, M, and through the colter, secures the former to the latter, and a hook-plate, N, secured to the beam by the clevis-bolts, serves to hold the front end of the rod M.

It will be noticed that the braces I I and the bifurcated ends of the rod M and colter F are provided with a series of holes located in pairs. The purpose of this arrangement is to allow an adjustment of the colter to different slants (the beam A also being provided with a series of holes) to give a more or less direct action of the colter against the obstructions, as may be desired, and according to the character of the soil with reference to said obstructions.

The operation of my invention is as follows: The colter being set at the desired angle and with its point slightly below that of the share, and an obstruction being met, the strain is distributed from the colter through rod M to the plate N, and through braces I I to the standard and beam at J, these points being so located as to distribute the strain to the strongest points in the plow. If the obstruction be a root of small or medium diameter, it is immediately cut, and if it be a rock not too deeply seated it is at once removed to one side or the other, and the plow advances with scarcely a perceptible opposition. If the obstruction be a root of large diameter, the first action of the colter is to cut into the root and then to ride up and over it, the cut acting to retain the colter from glancing to one or the other side of the cut, and the share following is guided over the root also. If the obstruction be a rock of the larger and deeply-seated sort, the colter, though loosing its function of cutting, still acts as a guide and carries the share safely over.

Having described my invention, its purpose, construction, and operation, what I claim as new, and wish to secure by Letters Patent, is—

1. A colter curved in its front outline and having a knife-edge, a dull edge below the knife-edge, and a rearwardly-curved point, as shown and described.

2. The combination of the bifurcated colter F, beam A, braces I I, and the standard B with the bolts L, G, H, and J, the latter passing through the braces, standard, and beam, as shown and described.

3. The combination of the bifurcated colter F, pivotally attached to the beam A, the braces I I, rod M, and hook-plate N, as shown and described.

In testimony whereof I affix my signature in presence of two witnesses.

WILLIAM RICHARDS.

Witnesses:
L. D. HEATHERLY,
J. P. WILDMAN.